US005864090A

United States Patent [19]

Wright

[11] Patent Number: 5,864,090

[45] Date of Patent: Jan. 26, 1999

[54] GROUND DEVICE AND METHOD OF GROUNDING A CABLE USING SAME

[75] Inventor: John O. Wright, York, Pa.

[73] Assignee: Osram Sylvania Inc., Danvers, Mass.

[21] Appl. No.: 922,924

[22] Filed: Sep. 3, 1997

[51] Int. Cl.[6] .......... H02G 7/00

[52] U.S. Cl. .......... 174/40 CC

[58] Field of Search .......... 174/40 CC, 88 C, 174/75 C; 439/423, 424, 396; 24/281

[56] References Cited

U.S. PATENT DOCUMENTS

| | | | |
|---|---|---|---|
| 3,194,877 | 7/1965 | Collier | 174/88 C |
| 4,416,501 | 11/1983 | Fusselman et al. | 439/396 |
| 4,455,057 | 6/1984 | Mariani | 174/84 C |

*Primary Examiner*—Nestor Ramirez
*Assistant Examiner*—Joseph Waks
*Attorney, Agent, or Firm*—William H. McNeill

[57] ABSTRACT

A grounding device is provided for use with a coaxial cable. The grounding device includes a forked member which includes a channel into which a coaxial cable may be inserted to pierce the jacket of the coaxial cable so that the forked member engages the ground wire of the coaxial cable. A gate attached to the fork and bendable relative to the fork member is then bent at a fold line so that the gate closes the channel to sandwich the pierced coaxial cable between the gate member and the forked member. A method of using the grounding device is also described.

18 Claims, 1 Drawing Sheet

GROUND DEVICE AND METHOD OF GROUNDING A CABLE USING SAME

TECHNICAL FIELD

The present invention relates to a grounding device for use with a coaxial cable. More particularly, the present invention relates to such a grounding device which is useful, without limitation, with conventional antenna connectors such as those used in the automobile industry for radios.

BACKGROUND ART

In many applications involving the use of a coaxial cable it is known to strip one or both ends of the cable to expose a length of the center conductor. Typically, a length of ground wire braid is then folded back upon the cable. In some instances, a metal sleeve is crimped to the outer peripheral PVC surface or jacket of the coaxial cable adjacent the stripped end and the ground wire braid is folded back upon such metal sleeve. A metal shell may also be provided adjacent the stripped end, the ground wire braid being sandwiched between the metal sleeve and the metal shell. Cables dressed in this manner are used, for example, with conventional antenna connectors such as those used in the automobile industry for radios. In such uses, each end of a coaxial cable prepared in this manner may have a respective connector such as a male or female connector mechanically and electrically attached thereto. It is known that if the ground wire braid is not dressed properly there may be a tendency for proper grounding not to be effected. Such ineffectiveness may occur immediately during use of the antenna cable or be intermittent in nature and occur sometime in the future. Some inexpensive redundant ground is desirable.

DISCLOSURE OF THE INVENTION

It is an object of the present invention to provide an improved grounding device for use with a coaxial cable.

It is yet another object of the present invention to provide an improved grounding device which can be attached to a coaxial cable to conductively engage the cable ground wire braid without the need to remove a portion of the jacket of the cable to expose a length of ground wire braid.

It is another object of the present invention to provide an improved grounding device for use with an antenna cable.

It is yet another object of the present invention to add grounding integrity to a grounded cable assembly by providing redundant ground.

Another object of the present invention is to provide redundant ground to a grounded cable at a vehicle sheet metal attachment point.

Yet another object of the present invention is to provide an improved grounding device which is less costly than those fabricated heretofore.

A further object of the present invention is to provide an improved method of grounding a coaxial cable.

These objects are achieved, in one aspect of the invention, by providing a grounding device having at least one first portion constructed and arranged for engagement with a ground wire of a coaxial cable. The first portion includes a forked member which includes (a) a first segment and (b) a first leg and a second leg extending from the first segment. The first leg is spaced from the second leg, and a channel is formed between the first leg, the second leg and the first segment. At least one second portion is coupled to the first portion and comprises a gate member bendable in relation to the forked member to open the channel in a first mode and to close the channel in a second mode. A method of grounding a cable using such a grounding device is also disclosed.

BRIEF DESCRIPTION OF THE DRAWINGS

This invention may be clearly understood by reference to the attached drawings wherein like parts are designated by like reference numerals and in which.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
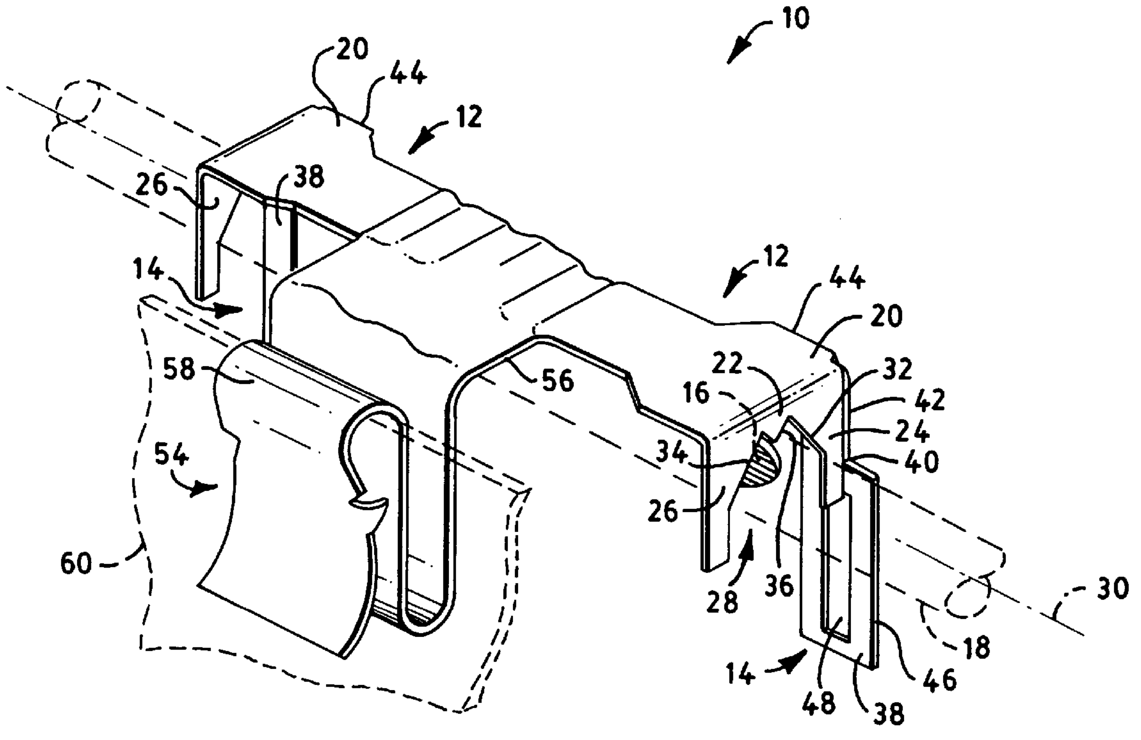
FIG. 1 is a perspective view of a grounding device embodying the present invention in an open mode, illustrated with a support structure and cable, shown in phantom lines.

Referring now to the drawings with greater particularity, FIG. 1 depicts a grounding device 10 which includes two first portions 12 and two second portions 14. More or less first and second portions 12, 14 may be provided if desired. In the embodiment illustrated in FIG. 1, each first portion 12 is identical to the other and each second portion 14 is identical to the other. Therefore, the discussion herein is directed to only one first portion 12 and one first portion 14, such discussion being equally applicable to the other. Each first portion 12 is constructed and arranged for engagement with a ground wire 16 of a coaxial cable 18. To this end, each first portion 12 includes a forked member 20 having a first segment 22 from which extends a first leg 24 and a second leg 26. The legs 24, 26 are spaced from each other and together with the first segment 22 form a channel 28 therebetween. Channel 28 comprises an axis 30 about which the first segment 22, first leg 24 and second leg 26 extend. In the embodiment illustrated in the drawings, the first leg 24 includes a ground wire engaging length 32 and the second leg 26 includes a ground wire engaging length 34. Similarly, the first segment 22 includes a ground wire engaging length 36. Length 36 is in the form of a projection. Each ground wire engaging length 32, 34, 36 face the axis 30 as best illustrated in FIG. 3.

Figure 2:
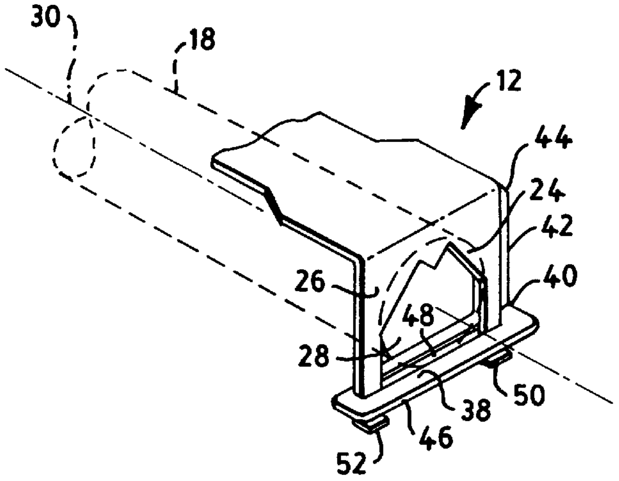
FIG. 2 is a portion of FIG. 1 illustrating the grounding device of FIG. 1 in a closed mode.
Figure 3:
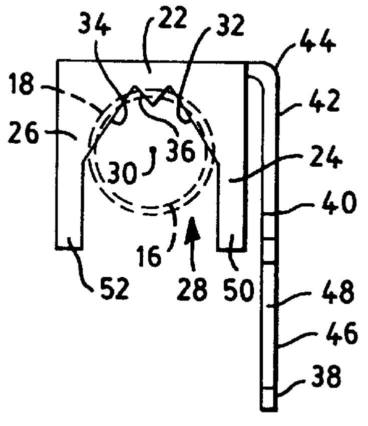
FIG. 3 is an end view of the grounding device of FIG. 1 illustrating the forked member of such grounding device engaging the ground wire of the cable.

Each second portion 14 is coupled to a respective first portion 12 and includes a gate member 38 which is bendable or foldable in relation to a respective forked member 20 to open a channel 28 in a first mode, which is illustrated in FIGS. 1 and 3, and to close a channel 28 in a second mode, which is illustrated in FIG. 2. In the embodiment illustrated in the drawings, each gate member 38 is bendable or foldable in relation to a respective forked member 20 along a bend or fold line 40 in a plane which is substantially perpendicular to the axis 30. With reference to FIG. 3, such plane may be represented by the sheet of paper upon which FIG. 3 is illustrated. In the embodiment illustrated in the drawings, each gate member 38 includes a first section 42 coupled to a respective forked member 20 at a bend or fold line 44 and an opposite second section 46 which includes an elongated aperture 48. As illustrated in FIG. 2, the first leg 24 and the second leg 26 are out of the elongated aperture 48 in the first or open mode and extend through the elongated aperture 48 when the grounding device 10 is in the second or closed mode to thereby close the channel 28.

In the embodiment illustrated in the drawings, the first leg 24 extends from the segment 22 to a first bendable distal end 50, and the second leg 26 extends from the segment 22 to a second bendable distal end 52. With reference to FIG. 2, the first and second distal ends 50, 52 are bendable into contact with the gate member 38 in a locked mode. With reference to FIGS. 1 and 3, the first and second distal ends 50, 52 are out of contact with the gate member 38 in an unlocked mode.

The grounding device of the present invention may include a grounding clip member coupled to the first portion 12. For example, as illustrated in FIG. 1, a grounding clip member 54 is coupled to the first portions 12 of the grounding device 10. In this embodiment, the grounding clip member 54 is positioned between the two first portions 12 illustrated in FIG. 1. Such grounding clip member 54 includes one end 56 which may be formed integrally with the first portions 12 and another end 58 which provides a clip for electrical and mechanical attachment of the grounding device 10 to a conductive structural grounding support 60. By way of example, the conductive structural grounding support 60 may be a vehicle sheet metal attachment point, the grounding device 10 providing grounding integrity in the form of redundant grounding for use with the visual grounding present at the cable connector, such as the cable connector of an antenna cable used in the automobile industry for radios.

A method of grounding a coaxial cable will now be described with reference to FIGS. 1 to 3. Referring to FIGS. 1 and 3, a coaxial cable 18 is inserted into each channel 28 of each forked member 20. Then the coaxial cable 18 is depressed into the channel sufficiently so that at least a portion of one of the surfaces 32, 34, 36 penetrates an outer jacket of the cable and engages the ground wire 16 of the cable. This step is carried out without the need to remove a portion of the jacket of cable 18 to expose a length of ground wire 16. It will be understood that one or more surfaces such as surfaces 32, 34, 36 may provide the boundary of the channel 28 and that one or more of such surfaces may penetrate the outer jacket of the cable 18 and engage the ground wire 16, as desired. In the embodiment depicted in FIGS. 1 and 3, all three surfaces 32, 34, 36 penetrate the outer jacket of the cable 18 and engage the ground wire 16. To this end surfaces 32, 34, 36 may have jacket penetrating edges. In the next step, the gate member 38 is bent along fold line 40 sufficiently to enclose the cable 18 in the channel 28 between the surfaces 32, 34, 36 and the gate member, as illustrated in FIG. 2. In the last step, the forked member 20 is electrically and mechanically connected to a conductive structural grounding support such as the support 60 depicted in FIG. 1, no testing being required. To this end, the clip end 58 of the grounding clip member 54 is clipped to the support as illustrated in FIG. 1. In the embodiment depicted in FIGS. 1 to 3, the gate member may be locked in place in the closed mode by folding the distal ends 50, 52 of respective legs 24, 26 against the gate member 38 to hold the gate member 38 against a portion of the outer jacket of the cable 18 as illustrated in FIG. 2.

Fabrication of the grounding device of the present invention may be accomplished using conventional procedures. For example, the grounding device 10, including forked members 20, gates 38 and grounding clip member 54 may be stamped from a metal sheet and then rolled and/or bent as required to form the desired configuration.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A grounding device, comprising at least one first portion constructed and arranged for engagement with a ground wire of a coaxial cable, said at least one first portion including a forked member having (a) a first segment and (b) a first leg and a second leg extending from said first segment, said first leg being spaced from said second leg, a channel being formed between said first leg, said second leg and said first segment, at least one second portion coupled to said at least one first portion and comprising a gate member bendable in relation to said forked member to open said channel in a first mode and to close said channel in a second mode, and wherein said channel comprises an axis about which said first leg, said second leg and said first segment extend, and wherein said gate member is bendable in relation to said forked member in a plane which is substantially perpendicular to said axis.

2. The grounding device of claim 1 wherein said gate member comprises a first section coupled to said forked member and an opposite second section which comprises an elongated aperture, and wherein said first leg and said second leg are out of said elongated aperture in said first mode and extend through said elongated aperture in said second mode.

3. The grounding device of claim 2 wherein said first leg extends from said first segment to a first bendable distal end and said second leg extends from said first segment to a second bendable distal end, and further wherein said first bendable distal end and said second bendable distal end are bendable into contact with said gate member in a locked mode and are out of contact with said gate member in an unlocked mode.

4. The grounding device of claim 1 further including a grounding clip member coupled to said at least one first portion.

5. The grounding device of claim 4 wherein said channel comprises an axis about which said first leg, said second leg and said first segment extend, and wherein said gate member is bendable in relation to said forked member in a plane which is substantially perpendicular to said axis.

6. The grounding device of claim 5 wherein said gate member comprises a first section coupled to said forked member and an opposite second section which comprises an elongated aperture, and wherein said first leg and said second leg are out of said elongated aperature in said first mode and extend through said elongated aperature in said second mode.

7. The grounding device of claim 6 wherein said first leg extends from said first segment to a first bendable distal end and said second leg extends from said first segment to a second bendable distal end, and further wherein said first bendable distal end and said second bendable distal end are bendable into contact with said gate member in a locked mode and are out of contact with said gate member in an unlocked mode.

8. The grounding device of claim 7 wherein said at least one first portion comprises one first portion and another first portion, and said at least one second portion comprises one second portion and another second portion.

9. The grounding device of claim 8 wherein said grounding clip member is coupled to said one first portion and said another first portion.

10. The grounding device of claim 9 wherein in said grounding clip member is positioned between said one first portion and said another first portion.

11. The grounding device of claim 1 wherein said at least one first portion comprises one first portion and another first portion, and said at least one second portion comprises one second portion and another second portion.

12. The grounding device of claim 11 further including a grounding clip member coupled to said one first portion and to said another first portion.

13. The grounding device of claim 12 wherein said grounding clip member is positioned between said one first portion and to said another first portion.

14. The grounding device of claim 1 wherein said channel comprises an axis about which said first leg, said second leg and said first segment extend, and further wherein said first leg comprises a ground wire engaging first length and said second leg comprises a ground wire engaging second length, said first length and said second length facing said axis.

15. The grounding device of claim 1 wherein said channel comprises an axis about which said first leg, said second leg and said first segment extend, and further wherein said first segment comprises a ground wire engaging length which faces said axis.

16. The ground of claim 15 further wherein said first leg comprises a ground wire engaging first length and said second leg comprises a ground wire engaging second length, said first length first and said second length facing said axis.

17. A method of grounding a cable, comprising the steps of inserting a cable into a channel formed by at least one surface of two legs of a forked member; depressing said cable sufficiently into said channel so that at least a portion of said at least one surface penetrates an outer jacket of said cable and engages a ground wire of said cable; bending sufficiently a gate member attached to said forked member in relation to said forked member in a plane which is substantially perpendicular to an axis about which said channel and said two legs extend to enclose said cable in said channel and between said at least one surface and said gate member; and connecting said forked member electrically and mechanically to a conductive structured grounding support.

18. The method of claim 17 further including the step of securing said cable in said channel between said forked member and said gate member by folding a distal end of each leg of said two legs against said gate member to hold said gate member against a portion of said jacket of said cable.

* * * * *